Jan. 20, 1925.
H. EBERHARDT
1,523,535
EMBROIDERING MACHINE
Filed Jan. 3, 1922
10 Sheets-Sheet 1
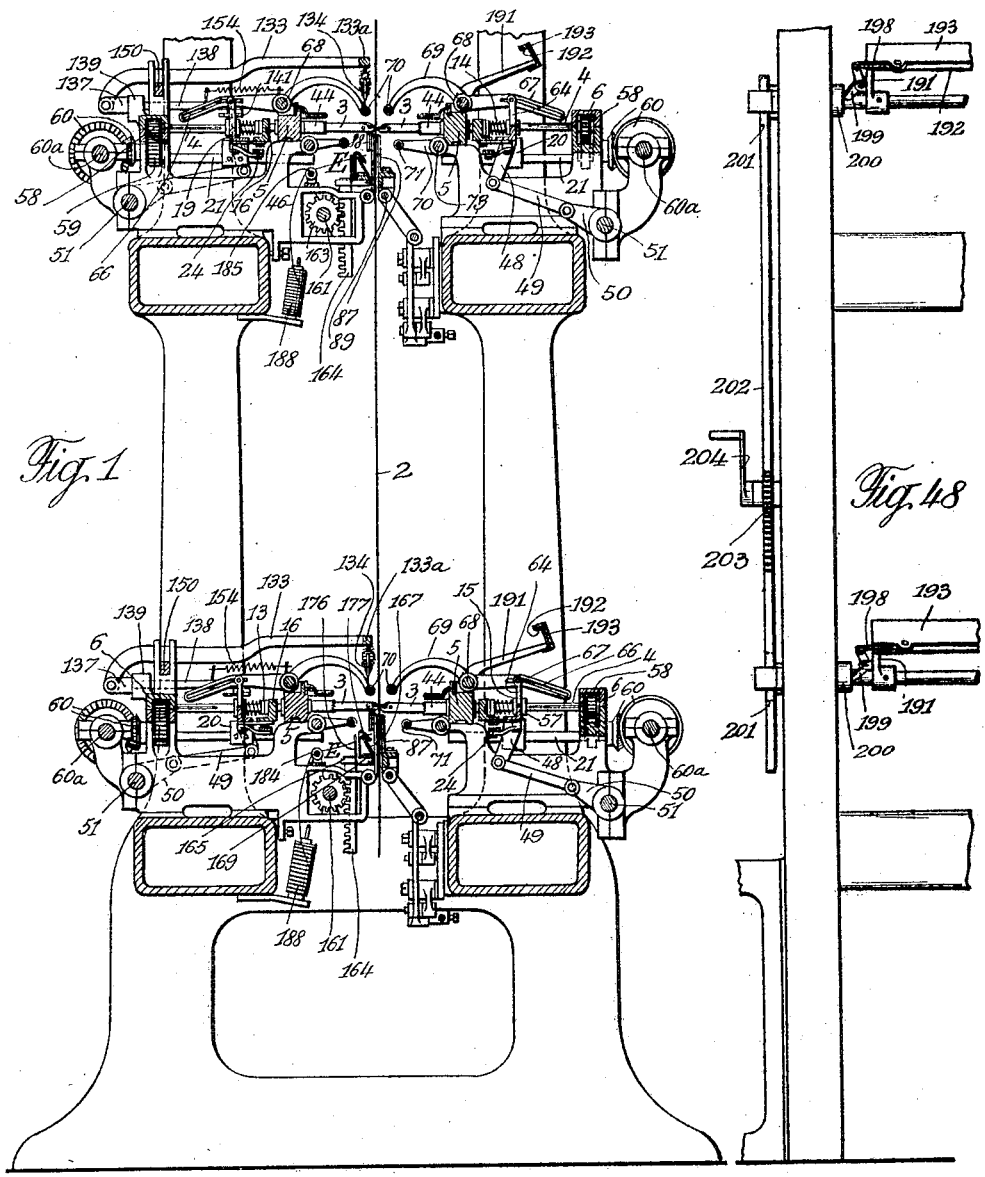
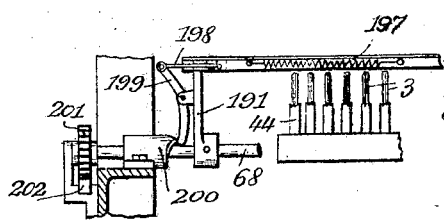
Inventor:
Hans Eberhardt.
By Henry Orth
Atty.

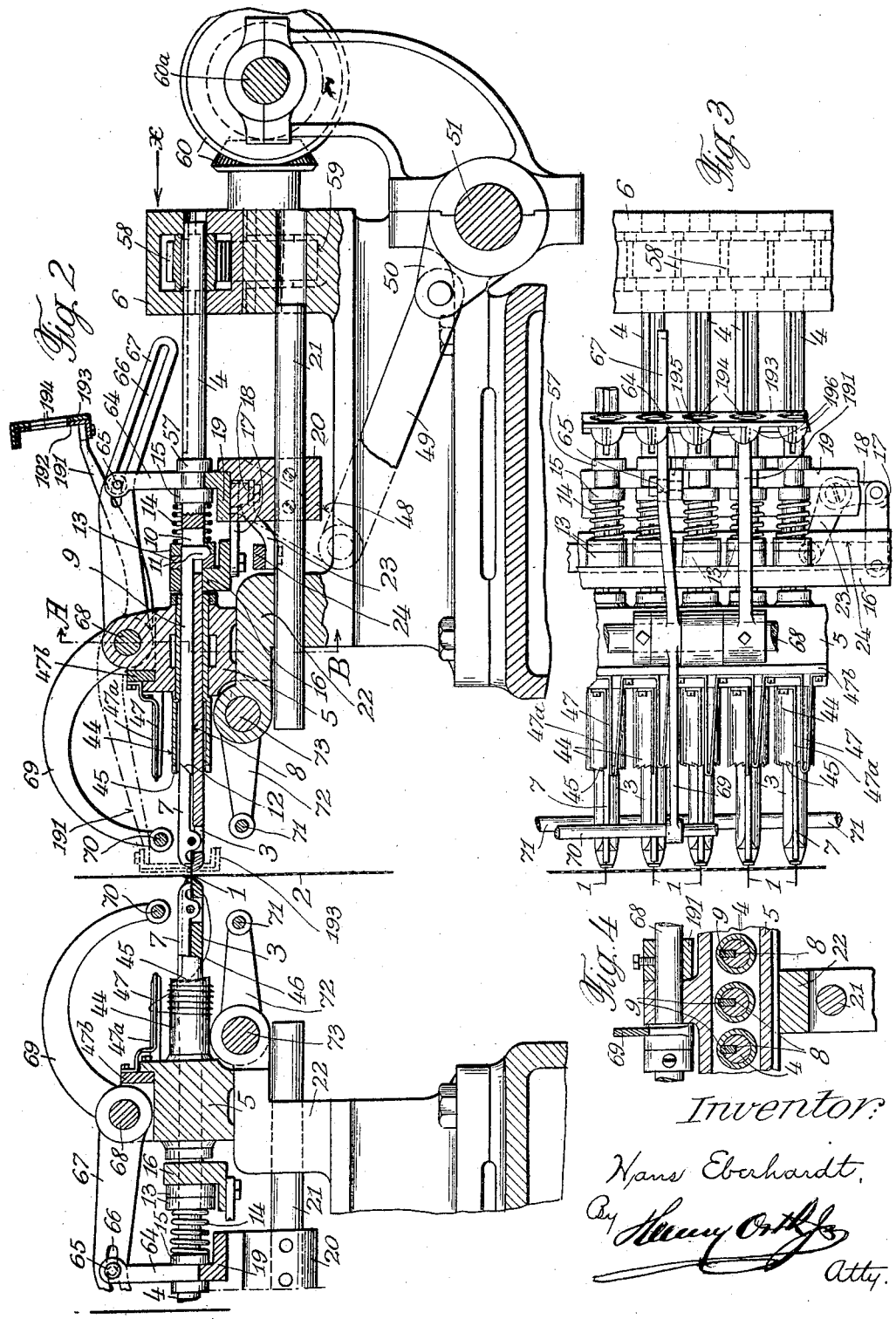

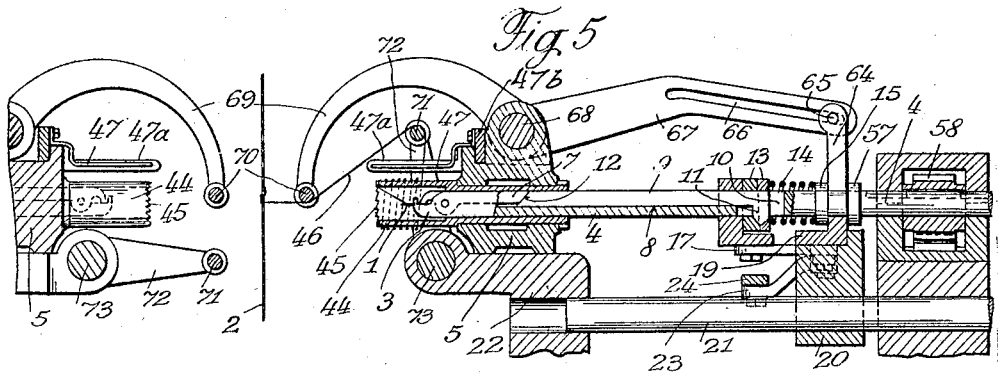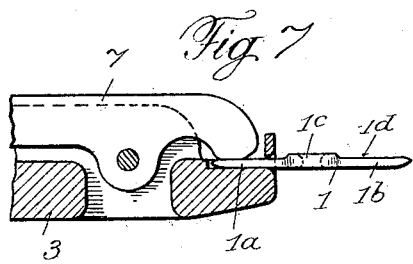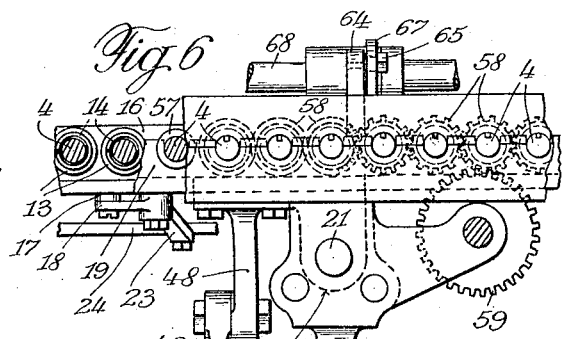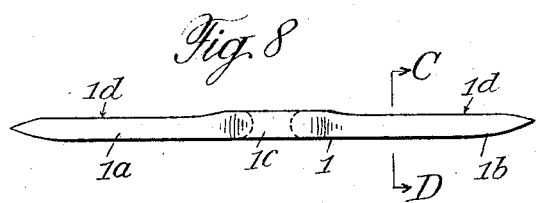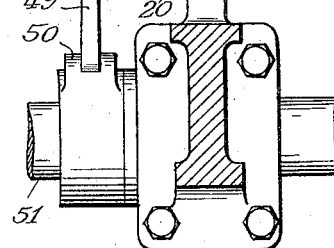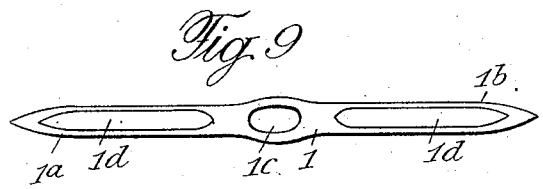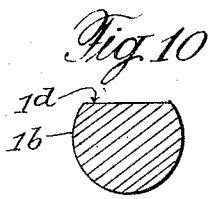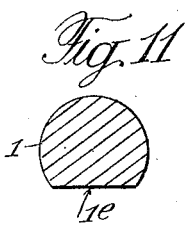

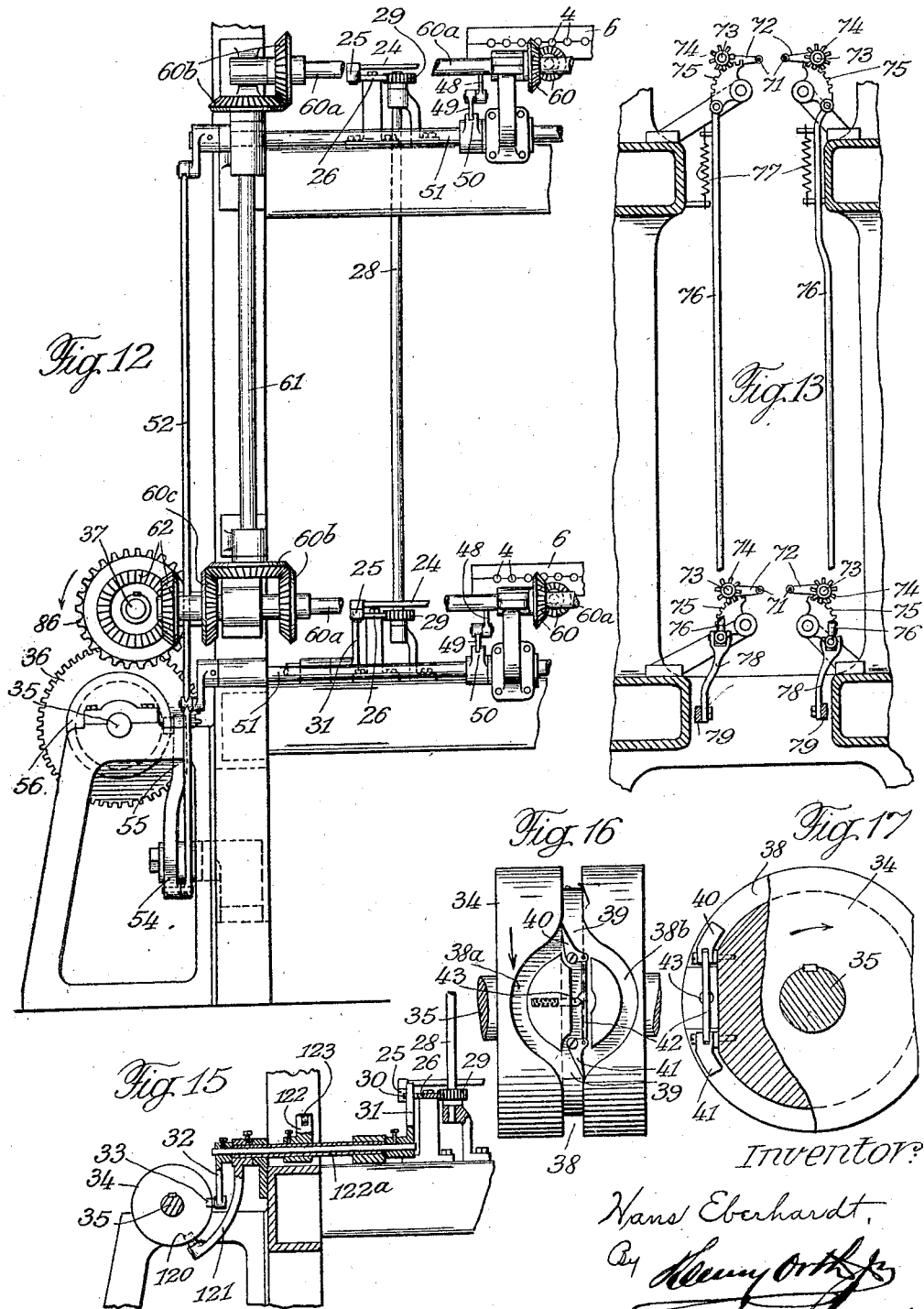

Jan. 20, 1925.
H. EBERHARDT
1,523,535
EMBROIDERING MACHINE
Filed Jan. 3, 1922     10 Sheets-Sheet 5
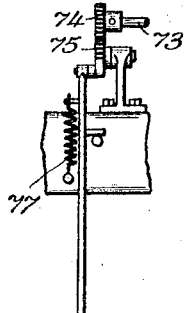
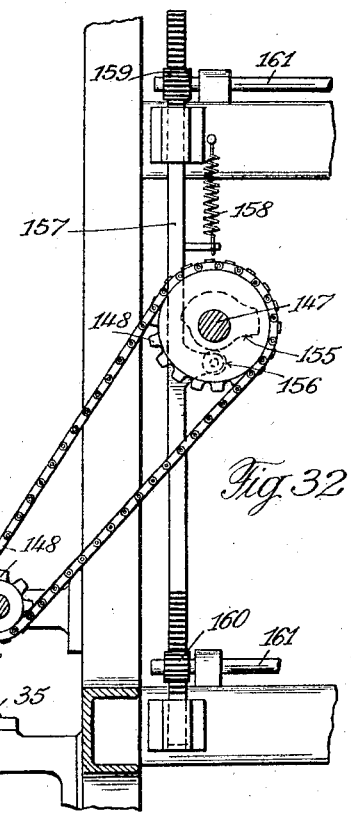
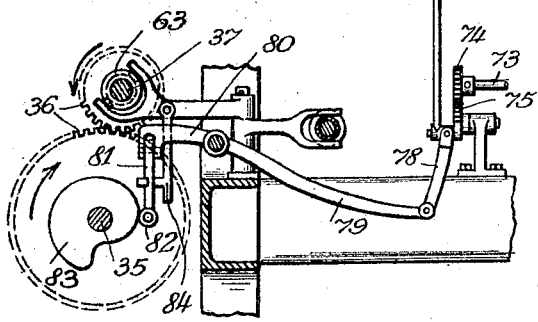
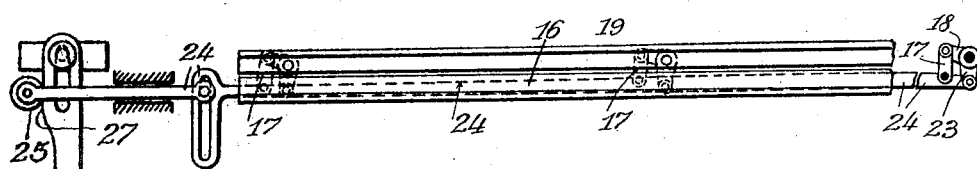
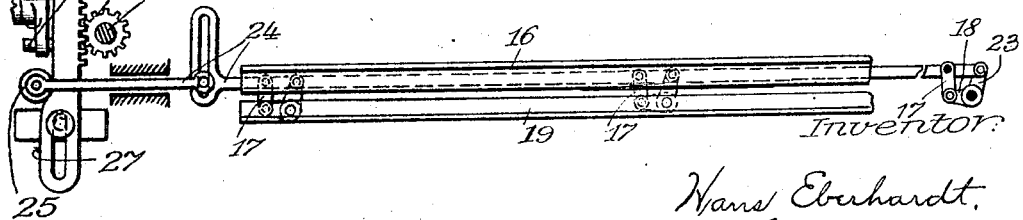

Jan. 20, 1925.　　　　　　　　　　　　　　　　　1,523,535
H. EBERHARDT
EMBROIDERING MACHINE
Filed Jan. 3, 1922　　　10 Sheets-Sheet 6
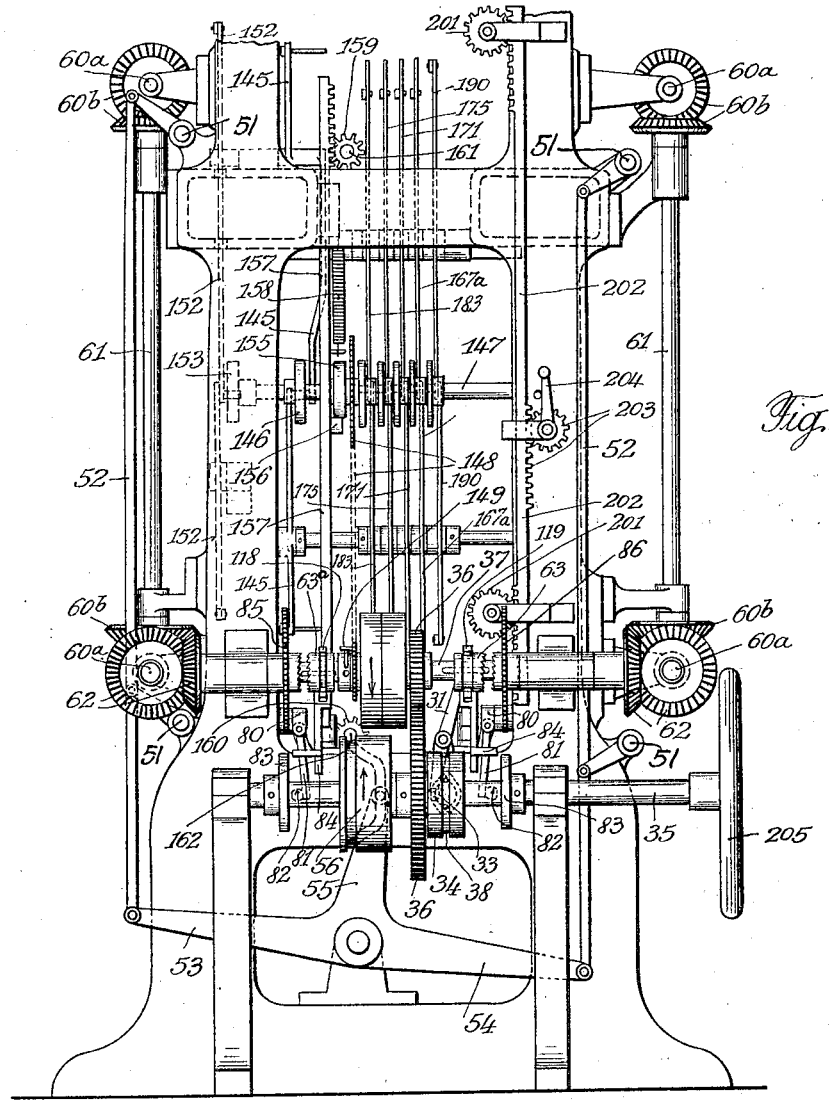
Fig. 19
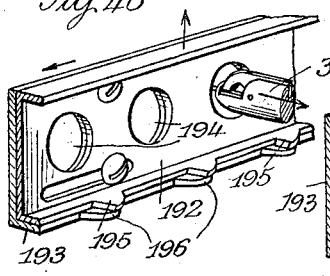
Fig. 46
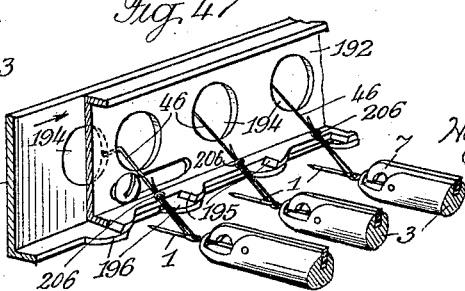
Fig. 47
Inventor:
Hans Eberhardt
By
atty.

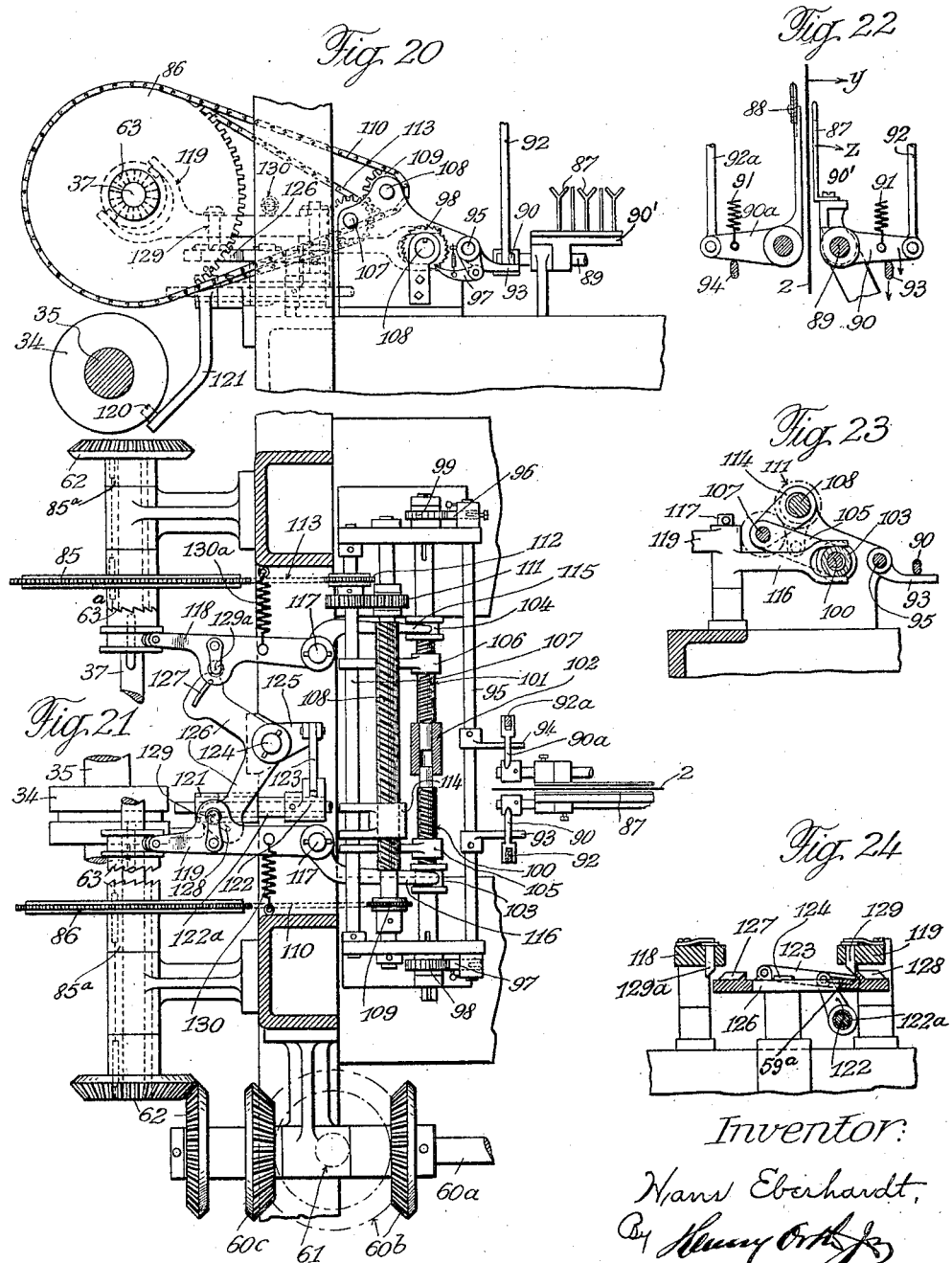

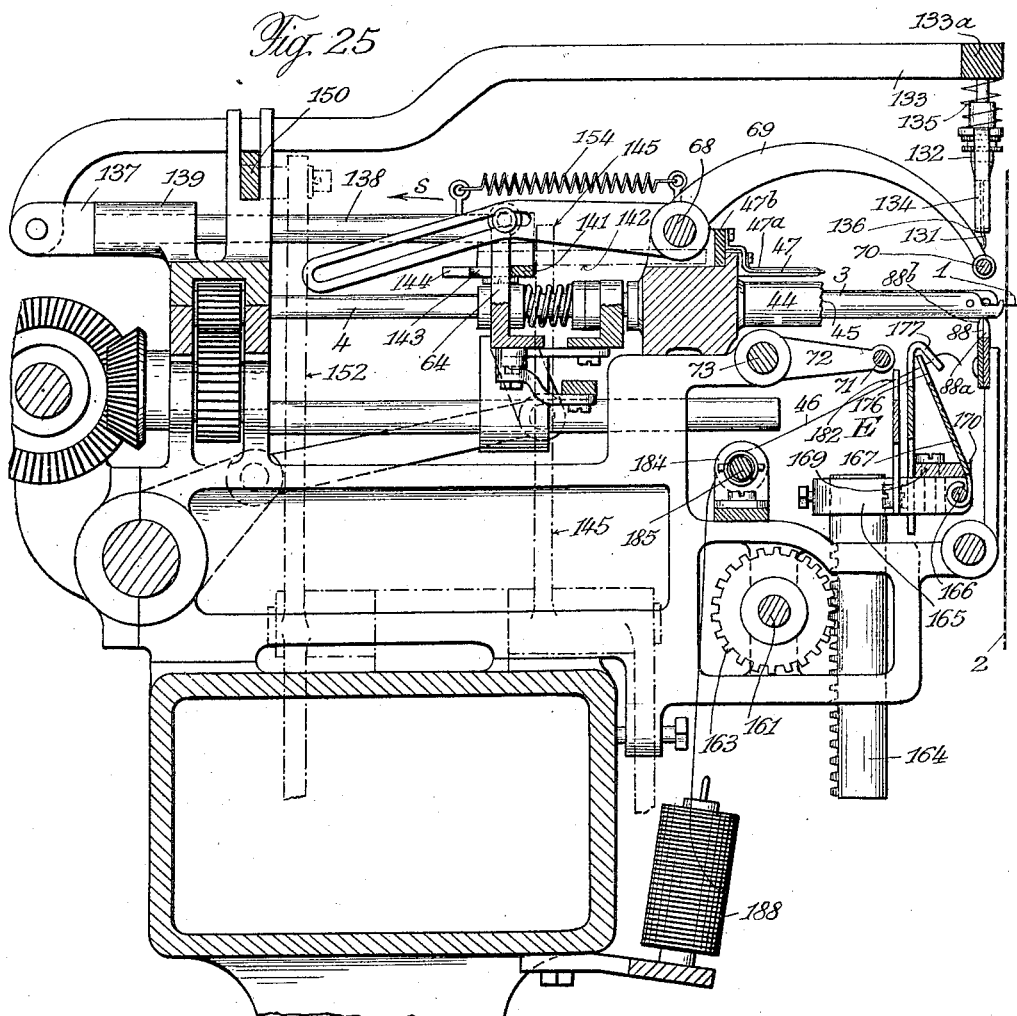
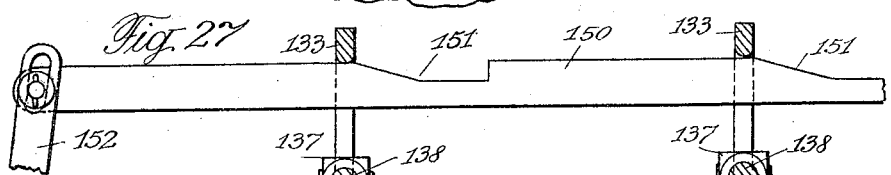
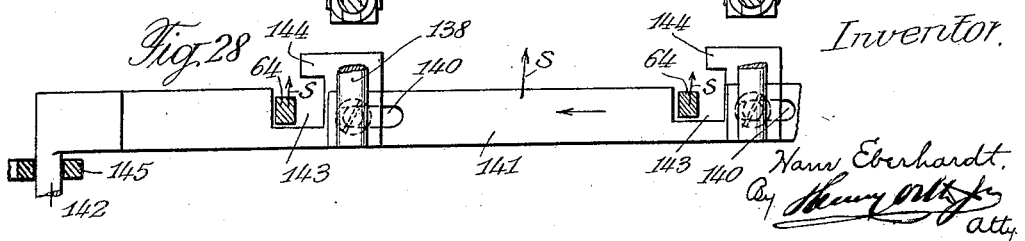

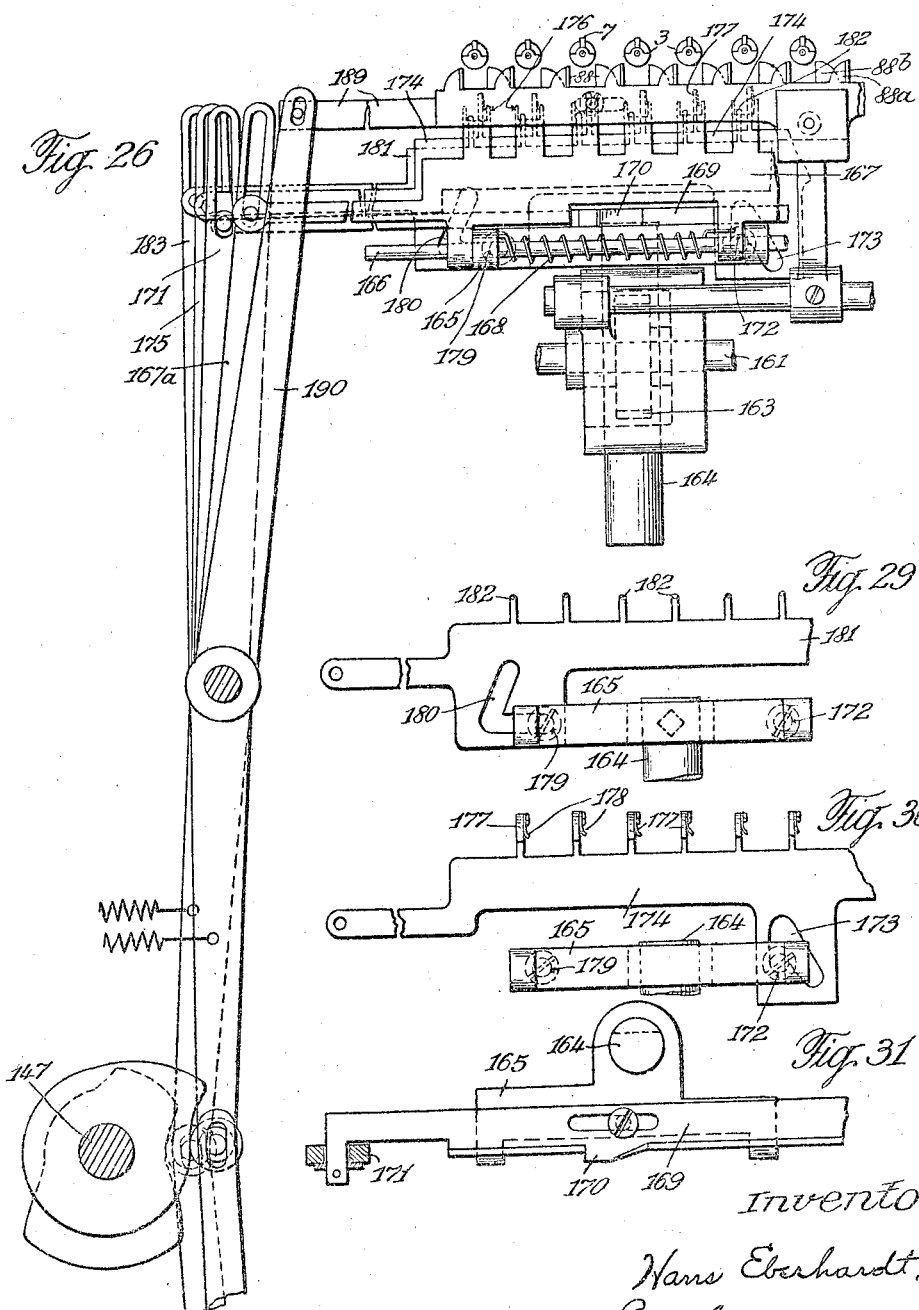

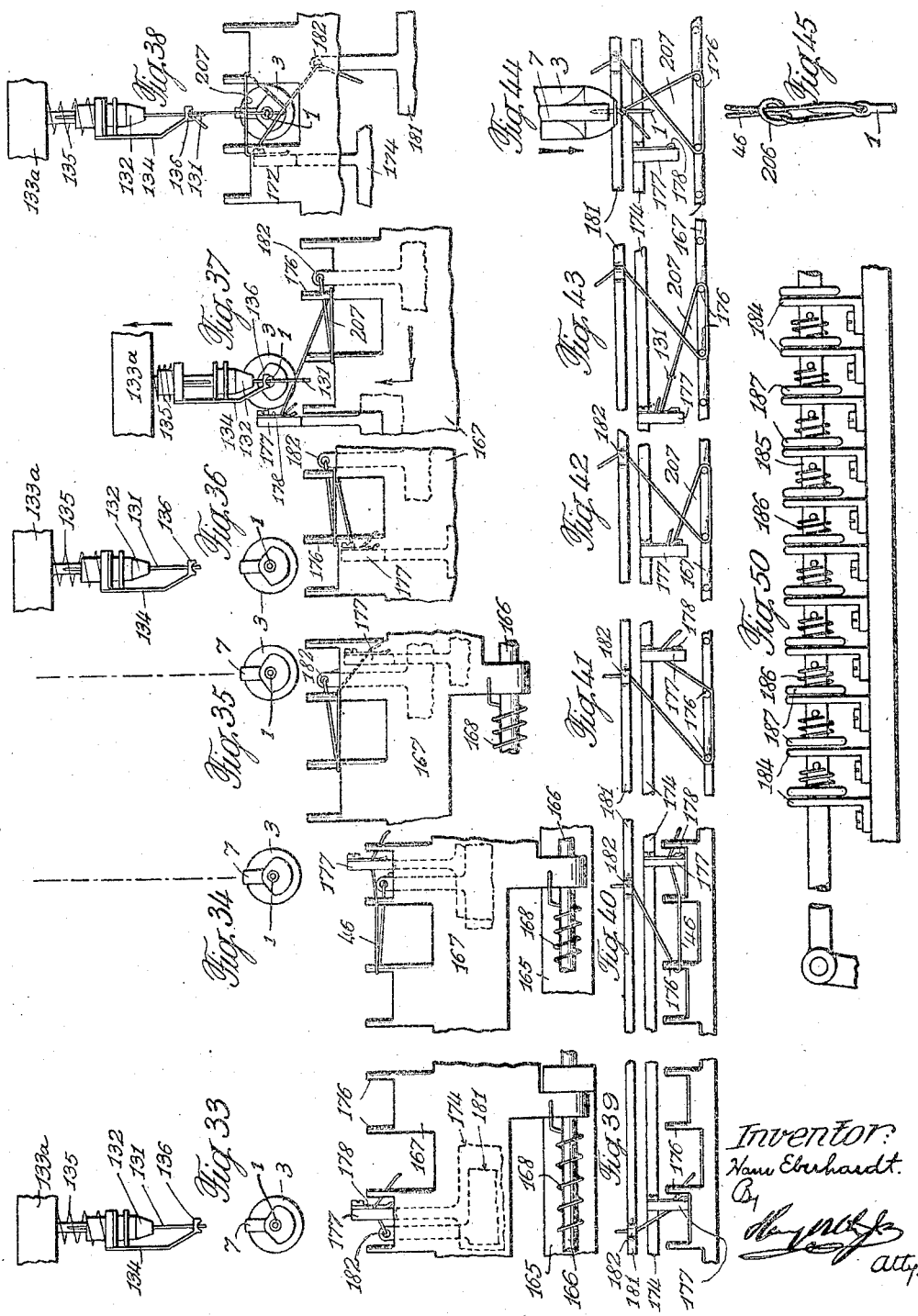

Patented Jan. 20, 1925.

1,523,535

UNITED STATES PATENT OFFICE.

HANS EBERHARDT, OF RUPPERSWIL, NEAR AARAU, SWITZERLAND, ASSIGNOR TO KARL KLAIBER, OF ZURICH, SWITZERLAND, AND EMIL ROHNER, OF RHEINECK, SWITZERLAND.

EMBROIDERING MACHINE.

Application filed January 3, 1922. Serial No. 526,654.

*To all whom it may concern:*

Be it known that I, HANS EBERHARDT, a citizen of the Republic of Switzerland, residing at Rupperswil, near Aarau, Switzerland, have invented certain new and useful Improvements in Embroidering Machines, of which the following is a specification, reference being had therein to the accompanying drawing.

The present invention relates to short thread embroidering machines provided with needles pointed at both ends similar to those used with hand operated embroidering machines. In the machines according to my invention the tension for drawing the thread up into the fabric is caused by winding the thread around the needle-clamp. Another feature of the invention consists in the provision of a device for effecting an automatic replacement of the consumed threads. Further the embroidering machine according to my invention is fitted with a device for causing other operative parts of the machine to take into account the shortening of the thread caused by that portion of the thread which is consumed upon each stitch. The needles are of a special design in order to ensure a proper working of the device for threading the needles. Other novel features of the invention are hereinafter fully set forth.

A constructional example of the subject matter of the present invention is illustrated in the accompanying drawings, in which:

Figure 1 is a vertical section on a small scale through the embroidering machine;

Fig. 2 shows part of the stitch making mechanism in a vertical section;

Fig. 3 is a plan view of Fig. 2;

Fig. 4 is a vertical section along line A—B of Fig. 2,

Fig. 5 shows in a vertical section some parts of Fig. 2 in a different operative position;

Fig. 6 is a rear view of Fig. 2 shown in the direction of the arrow *x*;

Fig. 7 shows a needle held in the needle-clamp;

Figs. 8 and 9 are a side elevation and a plan view respectively of the needle;

Fig. 10 is a vertical section through the needle along line C—D of Fig. 8;

Fig. 11 is a vertical section through a modified construction of the needle;

Fig. 12 is a partial side view of the mechanism actuating the stitch making organs;

Fig. 13 is a front view of parts of the mechanism for actuating the tension bars;

Fig. 14 is a side view of parts shown in Fig. 13;

Fig. 15 is a vertical section through parts shown in Fig. 12,

Fig. 16 is a front view of the cam disc shown in Fig. 15;

Fig. 17 is a side view partly shown in section of the cam disc according to Fig. 16;

Fig. 18 illustrates in a plan view part of the mechanism effecting the opening of the needle-clamps;

Fig. 19 shows in a front elevation part of the driving mechanism for the embroidering machine;

Fig. 20 shows details of the mechanism utilized for taking into account the shortening of the threads and Fig. 21 is a plan view of said mechanism, while Figs. 22–24 show details of the latter;

Fig. 25 is a front elevation of part of the embroidering machine provided with parts of the device for replacing the threads.

Fig. 26 shows some parts of Fig. 25 in side elevation

Figs. 27 and 28 are plan views of details referring to Fig. 25 and

Figs. 29–31 show details of parts illustrated in Fig. 26;

Fig. 32 illustrates in elevation part of the threading mechanism, and

Figs. 33–38 show in elevation some parts of said mechanism in different working positions and Figs. 39–44 are plan views of the parts in the working positions according to Figs. 33–38;

Fig. 45 shows the finished knot;

Figs. 46 and 47 illustrate in a perspective view means adapted to sever the knot and Figs. 48 and 49 show in elevation and in a plan view respectively parts of the mechanism for actuating said means and Fig. 50 is a part of the device for clamping the thread.

Referring now to the drawings, 1 denotes one of the needles that is pointed at both ends and which is shown in Fig. 2 in the position in which it penetrates the fabric 2. As the main parts of the machine situated to the left and to the right hand side of the fabric are in their essential features duplicates of each other, only one of said parts will therefore be described and with reference to only one of the numerous needles. In the drawings only a sufficient part of the entire apparatus necessary to render the description of the novel features intelligible is shown. A needle-clamp 3 is formed as a part of a round rod 4 that is rotatable and displaceable in its axial direction in the support 5 and the bearing 6, 7 denotes the movable jaw of the needle-clamp, the lower or stationary jaw may be provided with a V-shaped groove in which the needle lies, an apertured vertical flange being provided at the end of the lower jaw. At both ends $1^a$ and $1^b$ of the central eye $1^c$, the needle is provided with a flattened portion $1^d$, (Fig. 7–10). These flattened portions serve a purpose hereinafter described, to determine the direction of the axis of the eye $1^c$ when the movable jaw engages the flattened portion when the needle-clamp is closed. A flattened portion $1^d$ at both ends of the eye $1^c$ may also be arranged, as is shown in Fig. 11, at $1^e$ on the lower side of the needle for the same purpose. The rod 4 of the needle-clamp (Fig. 2) is provided with a longitudinal groove 8 in which a bar 9 is inserted. The groove is extended at 10 to form a slot through the rod 4 in which slot lodges a nose 11 provided on the bar 9. The bar 9 is provided in front with an oblique end face 12 which is in operative engagement with a corresponding face on the rear arm of the movable jaw. The nose 11 is held between two collars 13 loosely mounted on the rod 4. A helical spring 14 presses said collars in one direction and abuts against a collar 15 fixed on the rod 4. One of the rings 13 abuts against a bar 16 of angular cross-section (Figs. 3 and 6) that extends across the whole length of the machine, the bar being provided with holes through which the rods 4 pass. These bars 16 serve to open the needle-clamps of the respective rows of needles. Links 17 are each connected at one end to the bar 16 while the other end is articulated to one arm 18 of a bell-crank lever, the other arm 23 of which is rotatably mounted in a second bar 19 of angular cross-section. The bar 19 is arranged parallel to the bar 16 and is, at intervals, fixed to supports 20 which are secured to rods 21 guided in the bearings 6 and the bracket 22. The other arm 23 of the bell crank lever is bent in the downward direction and is linked to a bar 24. Upon a displacement of the bars 24 in their longitudinal direction the rings 13 are, by the intermediary of the bar 16, urged against the action of the springs 14; in this manner all the bars 9 are caused to recede and all the needle-clamps 3, 7 are simultaneously opened. The displacement of the bars 24 of the lower and upper row (Figs. 12 and 18) occurs simultaneously. To this end the bars 24 are, under the influence of the springs 14 (Fig. 1), caused with rollers 25 (Fig. 18) to abut against bars 26 provided with cam faces 27. These bars 26, one of which is arranged in connection with the upper row of needles and the other with the lower row of needles (Fig. 12) are designed as gear racks over a portion of their lengths and mesh with pinions 29 provided on a shaft 28 common to both pinions. By means of two lugs 30 provided on the lower bar 26 there is operative engagement of a swingably mounted lever 31 that is rigidly connected to a lever 32, (Fig. 15) lost motion or clearance being provided in said operative engagement. The lever 32 is provided with a roller 33 that engages in a groove of a cam disc 34 mounted on an auxiliary shaft 35 (Fig. 19) to which disc rotation is imparted by means of a toothed gearing 36 from the main driving shaft 37. The disc 34 (Figs. 16 and 17) is provided with a groove 38 on its circumference. The groove 38 shows deviations $38^a$ and $38^b$. At the points 39, i. e. where the two deviations $38^a$ and $38^b$ meet, two pivoted point switches 40 and 41 are linked together by a rod 42, the latter being held in its two extreme positions by means of a spring loaded pin 43 co-operating with a projection on the rod 42. When the switch 40 is in the position illustrated in Fig. 16 and when the disc 34 rotates in the direction indicated by the arrow the switch 41 blocks the deviation $38^b$. The roller 33 is then caused to enter the deviation $38^a$, hits the switch 40, throws it and continues its movement in the straight groove 38. During the following rotation of the disc the roller enters the deviation $38^b$ as the deviation $38^a$ is blocked, throws the switch 40 and in this manner reverses the switches. In consequence thereof the bar 26 (Fig. 18) is displaced first in one direction and then in the other direction so that the needle-clamps on one side of the machine and thereafter on the other side thereof are opened.

For winding up the thread there is mounted on each rod 4 carrying a needle-clamp, a cylinder 44 (Figs. 2 and 3) that does not take part in the axial displacement of the rod but does take part in the rotary movement of the latter. These cylinders are provided at their front end with teeth or serrations 45 for engaging the thread 46, 47, (Fig. 5) denotes plate springs secured to a bar $47^b$. Parallel to each plate spring 47 there are arranged plate springs $47^a$ rigidly fixed to the support 5. The thread passes between the plate springs 47 and 47ª which serve as a brake when the thread is wound upon the cylinders.

To the support 20 is rigidly secured (Figs. 2 and 6) an arm 48 to which a connecting rod 49 is linked, which is reciprocated by means of a crank 50, mounted upon a shaft 51. The upper and the lower shafts 51 (Fig. 19) are on each side of the plane of the fabric connected to each other by coupling rods 52. The latter act on the ends of two arms 53 and 54 of a three-armed lever, the other arm 55 of which co-operates by means of a roller with a groove of a disc 56 mounted on the auxiliary shaft 35. In this manner the support 20 is moved to and fro at intervals. The bar 19 fixed to the support 20 projects in between the collars 15 and 57 (Figs. 2, 3, and 6) so that upon the to and fro movement of the support 20 the rods 4 provided with the needle-clamps are reciprocated and recede (as is shown in Fig. 5) into the cylinders 44 the latter being stationary during this axial displacement of the rods 4.

On each rod 4 carrying the needle-clamps is loosely mounted a pinion 58 relatively to which the rod 4 can be displaced in the axial direction, the rod 4 being, however, turned upon a turning movement of the gear wheel. All the pinions 58 of the needle-clamps arranged beside each other intermesh, (Fig. 6) and are turned from time to time through a gear wheel 59. The gear wheel 59 is rotated by the intermediary of bevel gears 60 (Figs. 1, 2 and 19), shaft 60ª, bevel gears 60ᵇ, shaft 61, from the bevel gear 62 loosely mounted on the main driving shaft 37. The bevel gears 62 on each side of the machine are singly actuated by means of coupling sleeves 63 and 63ª. This is effected by a special device that takes into account the shortening of the threads owing to the latter being consumed upon each stitch made, which device will be described hereinafter.

To the bar 19 brackets 64 (Fig. 2) are fixed at some distance from each other and carry laterally projecting pins 65. Each pin 65 projects into a slot 66 of a bent lever 67 which is secured upon an axle 68; the latter carrying curved levers 69 to the ends of which a bar 70 is attached. Upon a movement of the support 20 in the backward direction the tension or guide bar 70 moves from the position shown in Fig. 2 into that shown in Fig. 5. Below the needle-clamps is provided a second guide bar 71 attached to the lever arms 72. The latter are fixed to axles 73 (Figs. 1, 2, 5 and 14) that extend across the whole machine. To the extreme ends of the axles are secured pinions 74 which co-operate with toothed segments 75 (Fig. 13). The toothed segments of the upper and lower rows are linked together by means of rods 76 upon which springs 77 exert a pull. To the lower segments 75 (Fig. 14) levers 78 are operatively connected and each lever 78 is pivoted to one end of a double armed lever 79, 80. A lever 81 is pivoted to the lever arm 80. A roller 82 is provided at the end of the lever 81 in engagement with a cam 83 (Figs. 14 and 19). The cams 83 are fixed to an auxiliary shaft 35. Each lever 81 is turnably suspended and may be swung laterally by the action of a lever 84 into the position in which the two levers 81 are illustrated in Fig. 19, in which position the rollers 82 no longer co-act with the cams 83. This swinging motion of the levers 81 into and out of their operative position is effected by a mechanism diagrammatically shown in Fig. 19 which will be referred to hereinafter. The operation of the parts described above will now be explained proceeding from the position of the parts shown in Fig. 2.

Let it be assumed that the right hand needle-clamp has closed. Then the needle-clamp recedes towards the right into the interior of the cylinder 44. The tension bar 70 is lowered into the position indicated in Fig. 5 so that the thread 46 is drawn through the fabric 2 in a straight line. The bar 71 is raised and turns slowly into its position shown in Fig. 5 which brings the thread into contact with the teeth 45. At this instant the needle-clamp which has receded into the cylinder 44 starts to rotate together with the cylinder. The thread is thereby caught and wound upon the cylinder and unwound from the cylinder 44 on the other side of the fabric which cylinder remains stationary during this period. The gradual raising of the bars 71 causes the coils of the thread to lie close to each other on the cylinder. As soon as the thread is drawn out the rotary movement of the needle-clamp and the cylinder is interrupted, the bars 70 and 71 return into their initial positions, the needle-clamp moves forward whereupon the described movement of the bars 70 and 71 and the winding up of the thread is carried out on the other side of the fabric, the needle having been exchanged from the needle-clamp on the one side of the fabric to the opposite needle clamp.

Two of the lower pairs of bevel wheels 62 (Fig. 21) are fixed to sleeves 85ª and to which one of the halves of the couplings 63 and the chain wheels 86 are secured. The sleeves 85ª are loosely mounted on the shaft 37 (Figs. 19, 20 and 21) so that the chain wheels 85 and 86 are only rotated when their coupling halves are clutched in. In order to turn alternately the needle clamp 3, 7 on one side of the machine and thereafter the needle-clamp 3, 7 on the other side it is necessary to couple the chain wheel 86 and the chain wheel 85 alternately with the shaft 37 and this coupling action has to be carried out during a longer or a shorter period according to the length of the thread present on each needle in the following manner:

87 (Figs. 20 and 22) denote forks co-acting with one side of the fabric 2 and 88 are scissors arranged on the other side of the fabric. If now the thread is, on being wound upon the respective cylinder, drawn out in the direction of the arrow $y$ indicated in Fig. 22, the fabric 2 is pulled in the same direction, whereby the forks 87 are turned by the fabric in the direction of the arrow $Z$, the forks being fixed to a bar 90' of angular cross-section, which bar is fixed upon the turnably mounted shaft 89. Levers 90 are secured to the shaft 89. The levers 90 are held in their normal positions shown in Fig. 22 by springs 91. 92 denote rods connecting the levers 90 of the upper row with those of the lower row. If the thread is drawn out in the direction opposite to the arrow $y$ of Fig. 22 the fabric 2 pushes against the scissors 88 and a turning motion of the levers $90^a$ in the reversed direction results. The rod $92^a$ connects the levers $90^a$ of the two rows. Below the levers 90 and $90^a$ there are arranged levers 93 and 94 (Figs. 21 and 22). These two levers are fixed upon a rod 95 which is provided at its ends with spring-loaded pawls 96 and 97 respectively. These pawls co-act with ratchet wheels 98 and 99 respectively and turn thus said wheels through a small angle upon each performed stitch. The ratchet wheel 98 is in operative connection with the half 100 of a screw threaded spindle that is axially displaceable by a small amount and the ratchet wheel 99 is in operative connection with the other half 101 of the screw threaded spindle also slightly axially displaceable. The thread on one of the halves is a left hand thread while that on the other is a right hand thread and the spindles are mounted with their adjacent ends in a stationary bush 102. Rings 103 and 104, respectively, provided with peripheral grooves are fixed to the spindles, and lugs 105, 106 acting as stops are screwed on the spindles 100 and 101 respectively. The arrangement is such that by the action of the pawls and ratchet wheels 97, 98 and 96, 99 respectively, the stop members 105 and 106 respectively are intermittently and uniformly brought nearer to each other. The outer ends of the stops 105 and 106 are provided with eyes fitting loosely on a rod 107 (Figs. 21 and 23) which serves as a guidance. A screw threaded spindle 108 (Figs. 20 and 21) is arranged parallel to the two spindle halves 100 and 101. At one end of the latter a chain wheel 109 with a free wheel mechanism is mounted which is in operative connection by means of a chain 110 with the chain wheel 86. To the other end of the spindle 108 one wheel 111 of a reversing gear is secured which is in operative connection with the chain wheel 112 through the interposition of a free wheel mechanism of any known type, the chain wheel 112 co-operating with the above mentioned chain wheel 85 by means of a chain 113.

A nut 114 travels on the spindle 108 which is also guided on the rod 107 (Figs. 21 and 23). Upon a turning of the spindle 108 this nut is displaced in one or the other direction so that it may abut against the stops 106 and 105 respectively whereby the spindle half 101 or the spindle half 100 is axially displaced. The grooves of the sleeves 104 and 103 are engaged by forks of levers 115 and 116 (Figs. 20, 21 and 23) that are adapted to turn around fixed fulcrums 117 and which are rigidly connected to levers 118 and 119 (Figs. 20, 21 and 24). The levers 118 and 119 co-operate by means of rollers with grooves provided in the coupling halves 63 and $63^a$, which coupling halves are continuously rotated by the shaft 37 and are slidably arranged on the latter, while the chain wheels 85, 86 and the bevel wheels 62 are keyed on hollow shafts which are rotatably mounted on the shaft 37. When the nut 114 strikes against the stops 106 and 105 a reversal takes place of the rotary motion of the aforementioned elements that causes the rotary motion of the needle clamps. After each stitch the stroke of the nut 114 is reduced by the displacement of the stops 105, 106 in accordance with the reduction of the length of the thread and thereby the number of turns of the needle-clamps or in other words the duration of the winding up movement is altered and is thus always adjusted to the length of the thread to be wound up.

Arrangements are provided for securing the displaceable parts of the coupling 63 and $63^a$ in their respective extreme positions. To the shaft 35 (Figs. 19 and 21) there is secured as has been mentioned above, the grooved disc 34 with the groove of which a second roller 120 (Figs. 15 and 20) co-acts in addition to the above mentioned roller 33. The roller 120 is attached to a lever 121 that is mounted upon a sleeve $122^a$ to which a crank 122 is fixed. The movement of the roller 120 along the deviations $38^a$ and $38^b$ of the groove 38 on the cam disc 34 causes the shaft $122^a$ to carry out an oscillating movement. A link 123 provided with a slot $59^a$ is operatively connected to the crank 122 (Figs. 21 and 24) and this link co-operates with a lever 125 turnably mounted on a vertical pin 124 for causing an oscillating movement of the lever 125 in a horizontal plane. The length of the slot in the link 123 corresponds to the amount by which the roller 120 is deviated towards one side of the straight groove 38. Therefore when the roller returns into the straight groove 38 the lever 125 has not been actuated. This actuation, however, takes place during the next revolution of the cam disc 34 when the roller 120 enters the opposite deviation of the groove. A bell crank lever 126 is rigidly connected to the lever 125 which is provided with upright knife edges 127 and 128 at the ends of its two arms. When one arm 126 of the bell crank lever is in the position shown in Fig. 21 the knife edge 128 projects behind a pin 129 (Fig. 24) adapted to be displaced in the vertical direction against the action of a plate spring, so that the lever 119 is held in the position shown against the tension of the spring 130 whereby one of the couplings 63 is held in its inoperative position. The knife edge 127 on the other arm of the lever 126 is then in front of the respective pin 129$^a$ of the lever 118 so that the spring 130$^a$ holds the other coupling 63$^a$ in its operative position as is shown in Fig. 21.

Let it be assumed that the nut 114 strikes against the stop 106 whereby the spindle 101 is axially displaced and the coupling 63$^a$ is disengaged by the action of the grooved sleeve 104, and levers 115, 118; then the chain drive 85, 113, 112 and the spindle 101 will come to a standstill. The main driving shaft 35 with the cam 34 continues to rotate and as soon as the roller 120 enters the deviation 38$^a$ of the peripheral groove of the cam disc 34 the locking lever 126 is reversed by the action of the parts 121, 122$^a$, 123 and 125. The lever 115 118, which up to this moment has been locked by the nut 114 is now locked by the knife edge 127, while the coupling 63 is clutched in, whereby the chain drive 86, 109, 110 is rendered operative, the nut 114 is then displaced by the spindle 108 in the opposite direction until it strikes against the stop 105. The clutching in and out and therefore the periods during which the thread is wound up occurs in the same manner for the needle clamps on both sides of the fabric.

As the displacement of the fabric after every stitch is transmitted by the intermediary of the members 87, 88, to the pawls 96 and 97 and from there to the spindles 100, 101, the stops 105, 106 are brought nearer to each other after every stitch in accordance with the consumption of the thread. When the stops have reached the sleeve 102 the thread is totally consumed. As the stops are brought nearer to each other after every stitch the distance through which the nut 114 travels becomes continuously shorter. In consequence thereof the periods during which the thread is wound up by the needle-clamp becomes shorter, i. e. decreases in proportion to the consumed thread. The drawing out of the thread is therefore effectively regulated by means of this device.

As may be seen from the Figs. 1 and 25, a device E for threading the needles is shown arranged with parts above and below the needle-clamps on one side of the fabric 2. To this device appertain threading hooks 131 (Figs. 25, 33–38) situated above the needle-clamps. They are mounted in knobs 132 which are rigidly connected to a bar 133$^a$ attached to the ends of levers 133 that are spaced apart some distance from each other. 134 denotes guides for the hooks 131 which are held in position by springs 135, the guides being provided with a distance piece or saddle 136, so that, as is shown in Fig. 37, the guides may rest with said saddle piece upon the needle 1. Each lever 133 (Fig. 25) is pivoted to a cross-head 137 rigidly connected to or integral with a guide rod 138 upon which a tension spring 154 acts; the rod being mounted in a stationary bearing 139 and co-operating with a bar 141 by slots 140 (Fig. 28). The bar 141 is adapted to be displaced in the horizontal direction. The bar 141 is further provided with cut-out portions 143 which embrace the previously described bars 64, clearance being provided between the bar and said cut-out portion. Lugs 144 projecting laterally of the bars 64 are fitted to or integral with the bars 141, which lugs cause the bar 141 to take part in the movement of the bars 64 when the latter move in the direction of the arrow $s$ indicated in Fig. 28. The bars 141 are moved to and fro by means of levers 145 (Figs. 19 and 25) acting on the lugs 142, said levers being influenced by a cam 146 secured to a shaft 147 that is rotated from the main driving shaft 37 by means of a chain drive 148 after a jaw coupling 149 has been clutched in manually. With the aid of this mechanism the hook 131 appertaining to a needle-clamp rod 4 may be caused to recede simultaneously with the latter. However, it is necessary that the hook 131 has a determined position relatively to the eye of the needle, i. e. it must be vertically above the latter when the hook is used for drawing the thread through the eye of the needle. This performance could not be carried out with the parts in the position illustrated in Fig. 25. To this end the clearance between the cut-out portion 143 of the bar 141 and the bar 64 is so dimensioned and a lost motion provided that the needle-clamps are caused to recede first by the action of the rod 64, and after they have receded so far that the bar 64 abuts against the lug 144, the hook 131 is vertically above the eye of the needle, the rod 4 and the hook 131 are moved together further back until they occupy the position in which the hook 131 is lowered in order to pass through the eye of the needle. This lowering movement of the hook 131 is effected by a bar 150 (Figs. 27 and 25) on which bar the levers 133 are loosely supported. The bar 150 is provided with recesses 151 defined by an oblique and a straight side. When the lever 133 comes to rest in the recess 151 the hook 131 is lowered into the position shown in Fig. 37 which will be described hereinafter. The movement of the bar 150 is caused by the lever 152 (Figs. 19, 25, 27) which is rocked to and fro by an eccentric 153 secured to the cam shaft 147. Upon the cam-shaft 147 is mounted a further eccentric or cam disc 155 (Figs. 19 and 32) which co-operates with a roller 156 that is mounted on a toothed rack 157, a spring 158 urging the roller 156 towards the cam disc 155. Pinions 159 and 160 (Fig. 32) secured to the shafts 161 respectively, are in mesh with the upper and lower part respectively, of the toothed rack 157. Toothed racks 164 for each row of needles carry a support 165 (Figs. 1, 25, 29–31). On this support 165 there is provided a bar 167 rotatably mounted around a rod 166 (Figs. 25, 26, 33–38) and displaceable in its axial direction. The bar 167 is pressed against a bar 169 having wedge shaped lugs 170 by the action of springs 168 (Figs. 26–35). The bar 169 is operatively connected to one end of a double armed lever 171 (Figs. 19, and 26) which is controlled from a cam shaft 147 so that during determined intervals the upper and lower bars 169 can be displaced in their longitudinal direction and the bars 167 can be moved in a vertical direction by means of the lugs, 170. At the rear of the bar 167 and connected to the latter by means of pin 172 (Fig. 30) adapted to move in slots 173 upwardly and downwardly in an oblique direction is a bar 174 which is controlled by the interposition of a double armed lever 175 from the cam shaft 147. The bar 167 is provided on its upper edge with forks 176 having two prongs and the bar 174 is provided with hooks 177 bent towards the front having bent off springs 178 for clamping the thread (Fig. 30) at the side of said hooks. At the rear of the bar 174 a third bar 181 (Fig. 29) is situated and connected to the former by pins 179 adapted to move horizontally and upwardly in an oblique direction in slots 180; the bar 181 being provided with eyes 182 for the thread and its movements being also controlled from the cam shaft 147 by the interposition of a lever 183. At the rear of the above mentioned three bars a thread brake (Fig. 50) is arranged having stationary jaws 184 and movable jaws 187 the latter being mounted on a displaceably arranged bar 185 and being urged towards the stationary jaws 184 by the action of the springs 186. The bar 185 is displaced at certain times in order to open and close the thread brakes. 188 (Fig. 25) denotes spools from which the thread 46 is unwound. The thread 46 from the spools passes between the brake jaws 184 and 187, through the eyes 182 and is held near its front end in the clamps 178. In front of the three bars there are situated the scissors or cutting devices 88 which have already been mentioned. The cutting device consists of stationary cutting jaws 88$^a$ (Fig. 26) and movable cutting jaws 88$^b$. The movable cutting jaws are operated by a bar 189 which is also controlled from the cam shaft 147 by means of a double armed lever 190.

To the shaft 68 mentioned hereinbefore, on which the levers 69, 67 turn loosely, levers 191 are rigidly secured (Figs. 1, 2, 48 and 49) to which levers a bar 192 is rigidly attached, said bar extending along the whole length of the machine and a further bar 193 being provided adapted to be displaced along the bar 192. Said two bars 192 and 193 are provided with apertures 194 (Figs. 46 and 47) which allow the needle-clamps 3 to pass through. When the bar 193 is displaced relatively to the bar 192 the thread 46 will be clamped between the two. On their lower sides the bars are provided with jaws 195 and 196 that form together scissors. The springs 197 (Fig. 49) hold the two bars 192 and 193 in their normal position relatively to each other. A link 198 is operatively connected to the bar 193. The link 198 is coupled with a double armed lever 199 rotatably mounted on the arm 191 and bearing with its other end against a stationary sleeve 200 provided with a cam face. Upon the shafts 68 pinions 201 (Figs. 49 and 19) are mounted that mesh with a toothed rack 202. The latter may be displaced by means of a manually operated crank 204 and a toothed gear-wheel 203. By this means the bars 192 and 193 are brought from the position shown in full lines in Fig. 2 into the position shown in dotted lines.

When the thread is nearly consumed and a new piece of thread has to be threaded into the needle, the operator stops the embroidering machine, whereafter he still may actuate the various mechanisms in the described manner by turning the hand wheel 205 (Fig. 19). At first he brings the bars 192, 193 constituting the cutting device into the position indicated in dotted lines in Fig. 2 by turning the crank 204, so that the needle-clamps may pass through the registering apertures 194 of the bars 192 and 193 in the manner shown in Fig. 46. Thereafter he continues to turn the crank 204 so far that the bars 192 and 193 are displaced relatively to each other and that they are somewhat lifted with regard to the needle-clamps into the position illustrated in Fig. 47. By this procedure the thread 46 is clamped and upon the turning back of the bars 192, 193 into the initial position the loop of each thread is severed below the knot 206; this cutting device is thereafter returned into the position shown in full lines in Fig. 2. Then the operator throws in the coupling 149 so that the cam shaft 147 is now turned when the machine is actuated. The parts to be threaded are at first in the position shown in Figs. 33 and 39. The turning of the cam shaft 147 causes the bar 167 to be moved towards the left into the position shown in Fig. 34 whereby the prongs of the fork 176 move the thread one end of which is held fast in the clamp 178, into the position illustrated in Figs. 34 and 40 unwinding it thereby from the spool 188. Then the bar 167 swings, which movement is initiated by the movement of the bar 169, in the longitudinal direction, from the inclined position Fig. 40 into the vertical position shown in Fig. 41 and all the bars are raised into the position illustrated in Fig. 35 with the exception of the bar 174. Thereupon the bars 181 and 167 are displaced towards the left into the position shown in Figs. 36 and 37 whereby the end of the thread is pulled through and a loop 207 is thus formed. Then the bars 167 and 181 remain stationary while the bar 174 is raised in an oblique direction into the position according to Fig. 37. Now the hook 131 together with the lever 133 moves in a downward direction, the distance piece 136 comes to rest on the needle, the spring 135 being compressed thereby, and the hook 131 that has passed through the eye of the needle comes within reach of the end of the thread. Thereafter the hook 131 together with the arm 133 is raised whereby the thread is pulled from clamp 178, through the needle eye and held and then pulled up while frictionally held between the hook 131 and the distance piece 136. Then the bars 167 and 181 are moved halfway towards the left and thereafter the bar 167 is raised whereby the loop 207 is formed. The needle-clamp with its needle now passes through this loop 207 (Fig. 44) and the needle is transferred to the opposite needle clamp. The jaws 184 and 187 of the brake are pressed together so that the knot is drawn tight into the shape illustrated in Fig. 45. The bar 167 then swings back into the position shown in Figs. 39 and 25. When the needle-clamps move away from each other and when the knot is drawn the thread is wound upon one of the cylinders 44 in the manner described hereinbefore. The bar 174 moves downward in an oblique direction whereby the thread is again laid into the clamp 178. Then by the action of the scissor device 88 the thread is severed from the part of thread extending between the spool 188 and the clamp 178. All the above described movements of the various bars are derived from the turning motion of the cam shaft 147. Finally the coupling 49 is thrown out of gear and the machine is again ready for further embroidering.

I claim—

1. In an embroidering machine of the type described, needles pointed at both ends, needle-clamps, and means to wind the threads transversely of the clamps to draw the threads.

2. In an embroidering machine of the type described, needles pointed at both ends, needle-clamps rotatable about their longitudinal axis, and means to wind the threads around said needle-clamps.

3. In an embroidering machine of the type described, needles pointed at both ends, needle-clamps, means to cause a rotation of the needle-clamps about their longitudinal axes, and cylinders upon which the threads to be used are wound, said cylinders being operatively connected with said needle-clamps.

4. In an embroidering machine of the type described, needles pointed at both ends, needle-clamps, parts adapted to be moved in the longitudinal direction of the needle-clamps for effecting an opening of said needle-clamps, and means to wind the threads upon the needle clamps.

5. In an embroidering machine of the type described, needles pointed at both ends, the needles having flattened portions to each side of the centrally located eye, needle-clamps, and means to wind the threads around the needle-clamps.

6. In an embroidering machine of the type described, needles pointed at both ends, needle-clamps, means to hold a separate spool containing the thread for each needle, a mechanism for cutting the old thread loops, hooks for threading the needle, bars for the formation of loops and knots in the new pieces of thread, and means for severing said new pieces of thread from the spools.

7. In an embroidering machine of the type described, needles pointed at both ends, needle-clamps, and means influenced by the deflection of the fabric under tightening action of the thread, a member to gather and pull the thread mechanism actuated by said means including means for reducing the travel of said member in accordance with the shortening of the thread.

8. In an embroidering machine of the type described, needles pointed at both ends, needle-clamps, means to cause the thread to be drawn through the fabric and deflect it, and means including a stop that is displaced by the deflection of the fabric, said stop determining the termination of the drawing movement of said means.

9. In an embroidering machine of the type described, needles pointed at both ends, needle-clamps, means for effecting the drawing out of the threads by winding the latter around said needle-clamps and thereby deflecting the fabric, a main driving shaft, members interposed between said main driving shaft and said needle-clamps and including two clutch-couplings, adjustable stop means to throw said couplings in and out of gear, and means arranged at each side of the fabric and displaced by the deflected fabric upon each drawing out of the threads and adapted to influence the adjustment of said stop means.

10. In an embroidering machine of the type described, needles pointed at both ends, needle-clamps, means for effecting the drawing out of the threads by winding the latter upon said needle-clamps said drawing out of the threads operating to displace the fabric, a main driving shaft, members interposed between said main driving shaft and said needle-clamps and including two clutch couplings, a screw threaded spindle operatively connected to said clutch couplings and being turned in one or the other direction of rotation upon one or the other of the two couplings being clutched in, gears for operating said clutch couplings, a nut on said spindle, adjustable stop means influencing the clutch gear and being influenced by said nut, and means arranged at each side of the fabric and being displaced by the fabric upon each drawing out of the threads and adapted to influence the adjustment of said stop means.

11. In an embroidering machine of the type described, needles pointed at both ends, needle-clamps, means for effecting the drawing out of the threads by winding the latter upon said needle-clamps said drawing out of the threads operating to displace the fabric, a main driving shaft, members interposed between said main driving shaft and said needle-clamps and including two clutch couplings, a screw threaded spindle operatively connected to said clutch couplings and being turned in one or the other direction of rotation upon one or the other of the two couplings being clutched in, gears for operating said clutch couplings, a nut on said spindle, adjustable stop means influencing the clutch gear and being influenced by said nut, a device for coupling the gears for operating said two clutch couplings in their extreme positions, which device includes a grooved cam disc having deviations from a peripheral straight groove provided with point switches, a roller co-acting with said groove and operating said switches, an operative connection between said roller and the clutch gears, and means arranged on each side of the fabric and being displaced by the fabric upon each drawing out of the threads and adapted to influence the adjustment of said stop means.

12. In an embroidering machine of the type described, needles pointed at both ends, needle-clamps, means for effecting the drawing out of the threads by winding the latter upon said needle-clamps said drawing out of the threads operating to displace the fabric, a main driving shaft, members interposed between said main driving shaft and said needle-clamps and including two clutch couplings, a screw threaded spindle operatively connected to said clutch couplings and being turned in one or the other direction of rotation upon one or the other of the two couplings being clutched in, gears for operating said clutch couplings, a nut on said spindle, two spindles operatively connected to said clutch gears, a stop on each spindle adjusted upon the rotation of said spindle, and contacting with said nut, and means arranged at each side of the fabric and being displaced by the deflected fabric upon each drawing out of the threads and adapted to influence the turning motion of the spindles carrying the stops.

13. In an embroidering machine, the combination with needle transfer mechanism, of mechanism to wind the thread length about a needle transfer mechanism when holding and pulling the thread through the fabric and mechanism under the control of the fabric to decrease the length of thread pulled in accordance with the consumption thereof.

14. In an embroidering machine, the combination with two sets of clamps for double pointed needles and mechanism to cause the transfer of the needles through the fabric from one set of clamps to another, of threading mechanism to thread the needles while held by one set of clamps knotting means and means to sever lengths of thread after threading.

15. In an embroidering machine, the combination with two sets of clamps for double pointed needles and mechanism to cause the transfer of the needles through the fabric from one set of clamps to the other, of means to sever the thread end from the fabric, means to thread the needle, knotting means to tie the end of new thread in the needle, means to wind up a definite length of thread after the needle has been threaded and means to sever such length.

16. In an embroidering machine, the combination with two sets of clamps for double pointed needles and mechanism to cause the transfer of the needles through the fabric, of mechanism on one side of said fabric to sever the end of the thread from the needle, mechanism on the opposite side of the fabric to thread the needles held by the clamps on said side, knotting mechanism to tie the thread in the needle, mechanism to wind a definite thread length and means to sever said length.

17. In an embroidering machine, the combination with two sets of needle clamps for double pointed needles and mechanism to cause the transfer of the needles back and forth through the fabric; of hand controlled mechanism on one side of the fabric to sever the knotted thread ends from the needles; manually controlled mechanism to cause at will the transfer of the empty needles to the set of clamps on the other side of the fabric, means to retract the latter clamps to threading position, means to thread the needles, means to rotate the clamps to draw off a definite length of thread, and means to sever such length.

18. In an embroidering machine the combination with two sets of needle clamps and mechanisms to cause the transfer of the needles through the fabric from one set of clamps to another and vice versa; of mechanism for winding the thread length at each passage of the needles through the fabric and mechanism under the control of the fabric to decrease the duration of the winding of the thread to compensate for the length of thread consumed.

In testimony whereof I have affixed my signature.

HANS EBERHARDT.